(12) United States Patent
Nishikawa et al.

(10) Patent No.: US 7,020,744 B2
(45) Date of Patent: Mar. 28, 2006

(54) COMPUTER SYSTEM

(75) Inventors: Norifumi Nishikawa, Machida (JP); Kazuhiko Mogi, Yokohama (JP); Nobuo Kawamura, Atsugi (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 10/788,452

(22) Filed: Mar. 1, 2004

(65) Prior Publication Data

US 2004/0210726 A1 Oct. 21, 2004

(30) Foreign Application Priority Data

Mar. 27, 2003 (JP) .............................. 2003-086907

(51) Int. Cl.
*G06F 12/16* (2006.01)

(52) U.S. Cl. ................... 711/114; 711/161; 711/162

(58) Field of Classification Search ................ 711/161, 711/162
See application file for complete search history.

(56) References Cited

U.S. PATENT DOCUMENTS

| | | | |
|---|---|---|---|
| 6,366,987 B1 * | 4/2002 | Tzelnic et al. .............. | 711/162 |
| 6,535,967 B1 | 3/2003 | Milillo et al. ............... | 711/161 |
| 6,732,231 B1 * | 5/2004 | Don et al. .................. | 711/114 |
| 6,898,727 B1 * | 5/2005 | Wang et al. .................... | 714/4 |
| 2003/0229764 A1 | 12/2003 | Ohno et al. ................. | 711/147 |
| 2004/0030768 A1 | 2/2004 | Krishnamoorthy et al. . | 709/200 |
| 2004/0044851 A1 | 3/2004 | Dawson et al. ............. | 711/154 |

FOREIGN PATENT DOCUMENTS

JP 2002-278769 9/2002

OTHER PUBLICATIONS

"Veritas Cluster Volume Manage Veritas Cluster File System" pp. 2-14.
VERITAS Cluster Volume Manager, VERITAS Cluster File System, White Paper.

* cited by examiner

*Primary Examiner*—Kevin Verbrugge
*Assistant Examiner*—Shawn Gu
(74) *Attorney, Agent, or Firm*—Mattingly, Stanger, Malur & Brundidge, P.C.

(57) ABSTRACT

A method includes a configuration definition creation step of writing configuration information on a primary site into a storage subsystem; a data transfer step of copying the configuration information, which is written into a storage device, to a storage subsystem in a secondary site over a network; a data reception step of receiving the transferred configuration information and storing it in the storage subsystem in the secondary site; and a configuration definition step of reading the stored configuration information and settings up a server in the secondary site.

4 Claims, 6 Drawing Sheets

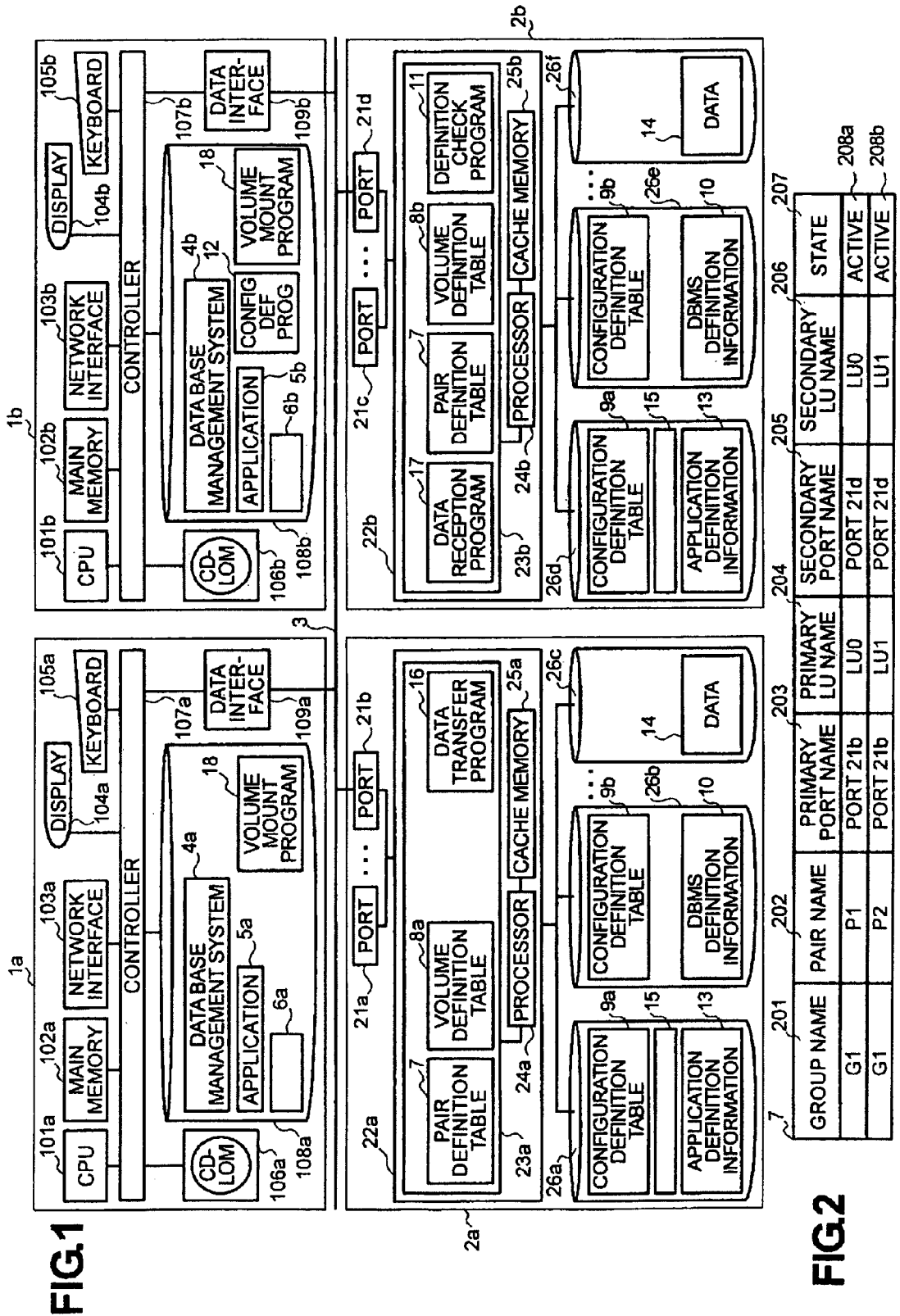

FIG.3

| PORT NAME | LU NAME | DRIVE NAME | EMULATION TYPE | SIZE |
|---|---|---|---|---|
| PORT 21b | LU0 | DISK DRIVE 26a | NONE | 100MB |
| PORT 21b | LU1 | DISK DRIVE 26b | RAID1 | 200MB |
| PORT 21b | LU1 | DISK DRIVE 26c | RAID1 | 200MB |

| PORT NAME | LU NAME | DRIVE NAME | EMULATION TYPE | SIZE |
|---|---|---|---|---|
| PORT 21d | LU0 | DISK DRIVE 26d | NONE | 100MB |
| PORT 21d | LU1 | DISK DRIVE 26e | RAID1 | 200MB |
| PORT 21d | LU1 | DISK DRIVE 26f | RAID1 | 200MB |

FIG.4

| MOUNT DESTINATION | STORAGE CAPACITY | EMULATION TYPE |
|---|---|---|
| /AP/vol1 | 100MB | NONE |

| MOUNT DESTINATION | STORAGE CAPACITY | EMULATION TYPE |
|---|---|---|
| /DB/vol1 | 200MB | RAID1 |

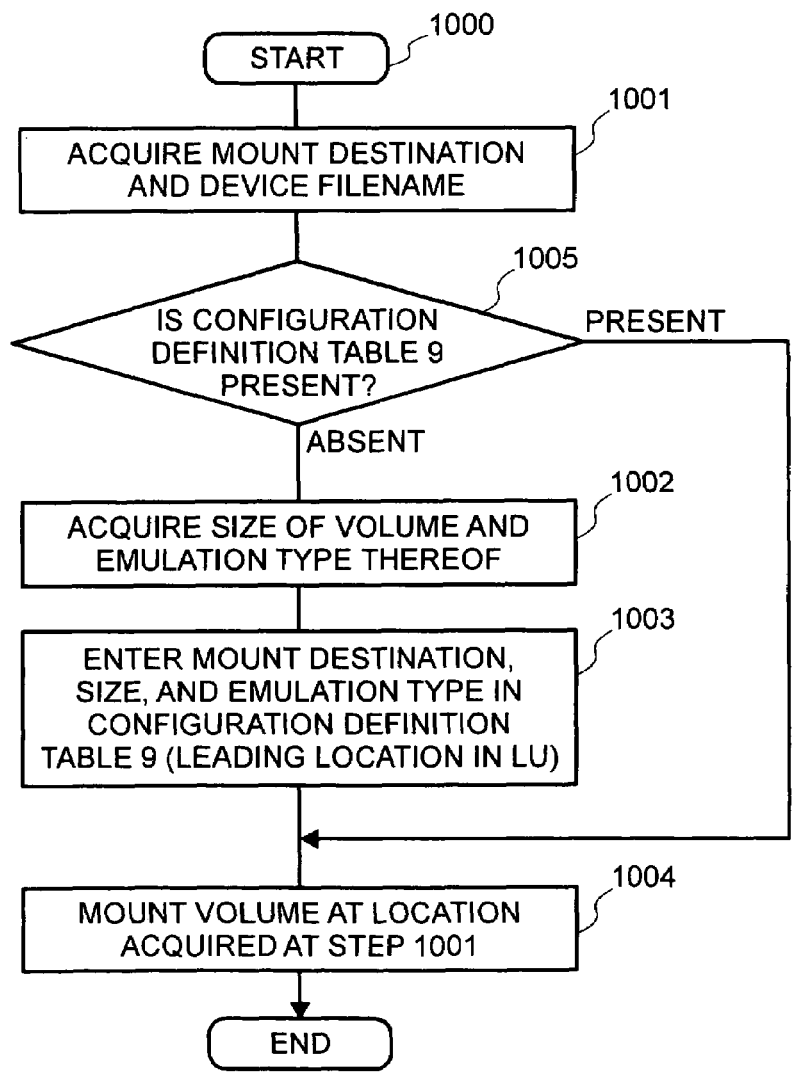

FIG.9
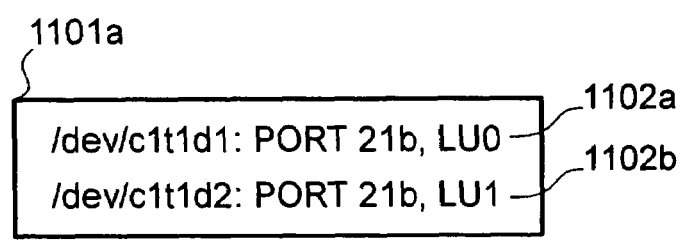
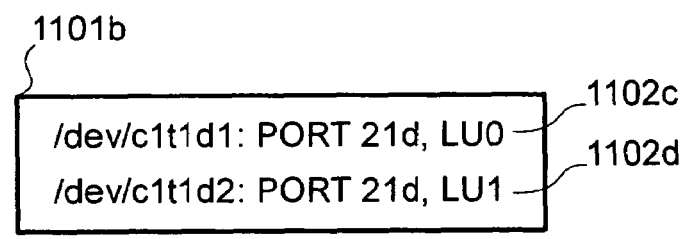
FIG.10
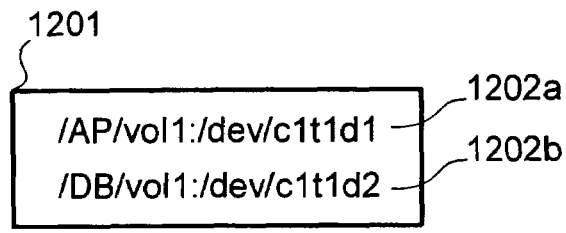

COMPUTER SYSTEM

BACKGROUND OF THE INVENTION

The present invention relates to a recovery system in which data is transferred between storage subsystems for the purpose of preserving data in case of a disaster.

A technique for adding a new computer to a network is disclosed in Japanese Unexamined Patent Application Publication No. 2002-278769. The disclosed technique is particularly applicable to a case where a second computer is added to a network system that comprises a first computer, a first storage subsystem in which an operating system (hereinafter OS) is stored, and a second storage subsystem in which a copy of data stored in the first storage subsystem is stored. According to the technique, the first computer modifies the settings of the second storage subsystem, and it assigns the second storage subsystem to the second computer so that the OS stored in the second storage subsystem can be installed in the second computer.

Moreover, a method for setting up a high-availability system, which employs a common disk, in a storage subsystem is disclosed in "VERITAS Cluster Volume Manager and VERITAS Cluster File System: a new VERITAS volume management and file system technology for a cluster environment (http://www.veritas.com/jp/products/pdfs/cvm_cfs_wp.pdf)". According to this method, a slave computer detects a common disk included in a storage subsystem, and it reads volume information from the common disk so as to define a common volume to be assigned to a slave computer included in a high-availability configuration. Consequently, the slave computer included in the high-availability configuration autonomously recognizes the volume.

SUMMARY OF THE INVENTION

According to the technology disclosed in Japanese Unexamined Patent Application Publication No. 2002-278769, after the second computer is added, the first computer modifies the settings of the second storage subsystem. In this case, if a fault occurs in the first computer, the second computer cannot use the second storage subsystem. Moreover, if the network system is used as a disaster recovery system, both the first and second computers are mandatory. Therefore, an inexpensive disaster recovery system cannot be provided.

Moreover, according to the technology disclosed in "VERITAS Cluster Volume Manager and VERITAS Cluster File System: a new VERITAS volume management and file system technology for a cluster environment," the slave computer can recognize the common volume autonomously. However, the master computer and slave computer must share the same storage subsystem. Therefore, the technology cannot be adapted to a disaster recovery system as it is. The adaptation of the technology disclosed in "VERITAS Cluster Volume Manager and VERITAS Cluster File System: a new VERITAS volume management and file system technology for a cluster environment" to a disaster recovery system will be discussed.

As far as a disaster recovery system is concerned, an entity of a disk drive is often different between a primary site and a secondary site. The consistency in an emulation type that is a category to which a disk drive belongs when assigned to a computer or in a storage capacity of a disk drive between the primary and secondary storage systems is not guaranteed. In this situation, the computer in the secondary site cannot recognize a volume autonomously.

Moreover, when an application, such as a database application that runs in the primary site, is to be continuously run in the secondary site, the settings of the secondary site must be determined manually. It is therefore impossible to continuously and swiftly run the application.

Accordingly, the present invention provides the constituent features described below. Namely, a computer system comprises a first computer, a first storage subsystem connected to the first computer, and a second storage subsystem connected to the first storage subsystem. Herein, information and various environmental variables (hereinafter, referred to as configuration information) that are needed to use the first storage subsystem and that are held in the first computer are transmitted to the first storage subsystem. The first storage subsystem stores the received configuration information in a storage device included therein. Thereafter, the first storage subsystem transfers the configuration information, which is stored therein, to the second storage subsystem so as to produce a copy. The second storage subsystem receives the transferred configuration information and stores it in a storage device included therein. Furthermore, when a second computer is added to the computer system, the second computer reads the configuration information stored in the second storage subsystem and determines the settings thereof by itself.

Herein, when it is indicated that the settings of the second computer are determined by itself, it is meant that a storage area included in the storage subsystem is assigned or mounted, and that definition information used in various applications is read.

Incidentally, the configuration information contains definition information needed to run an application and information needed to mount a storage area or a volume in a computer.

BRIEF DESCRIPTION OF THE DRAWINGS

FIG. 1 is a block diagram which shows an example of the configuration of a computer system;

FIG. 2 is a diagram which shows an example of a pair definition table 7;

FIG. 3 is a diagram which shows an example of a volume definition table 8;

FIG. 4 is a diagram which shows an example of a configuration definition table 9;

FIG. 7 is a diagram which shows an example of the pair definition table 7 specifying a suspended state;

FIG. 8 is a flow diagram which shows an example of a volume mounting procedure;

FIG. 9 is a diagram which shows examples of a volume-device file map; and

FIG. 10 is a diagram which shows an example of a mount destination directory-device file map.

DESCRIPTION OF THE PREFERRED EMBODIMENTS

Figure 5:
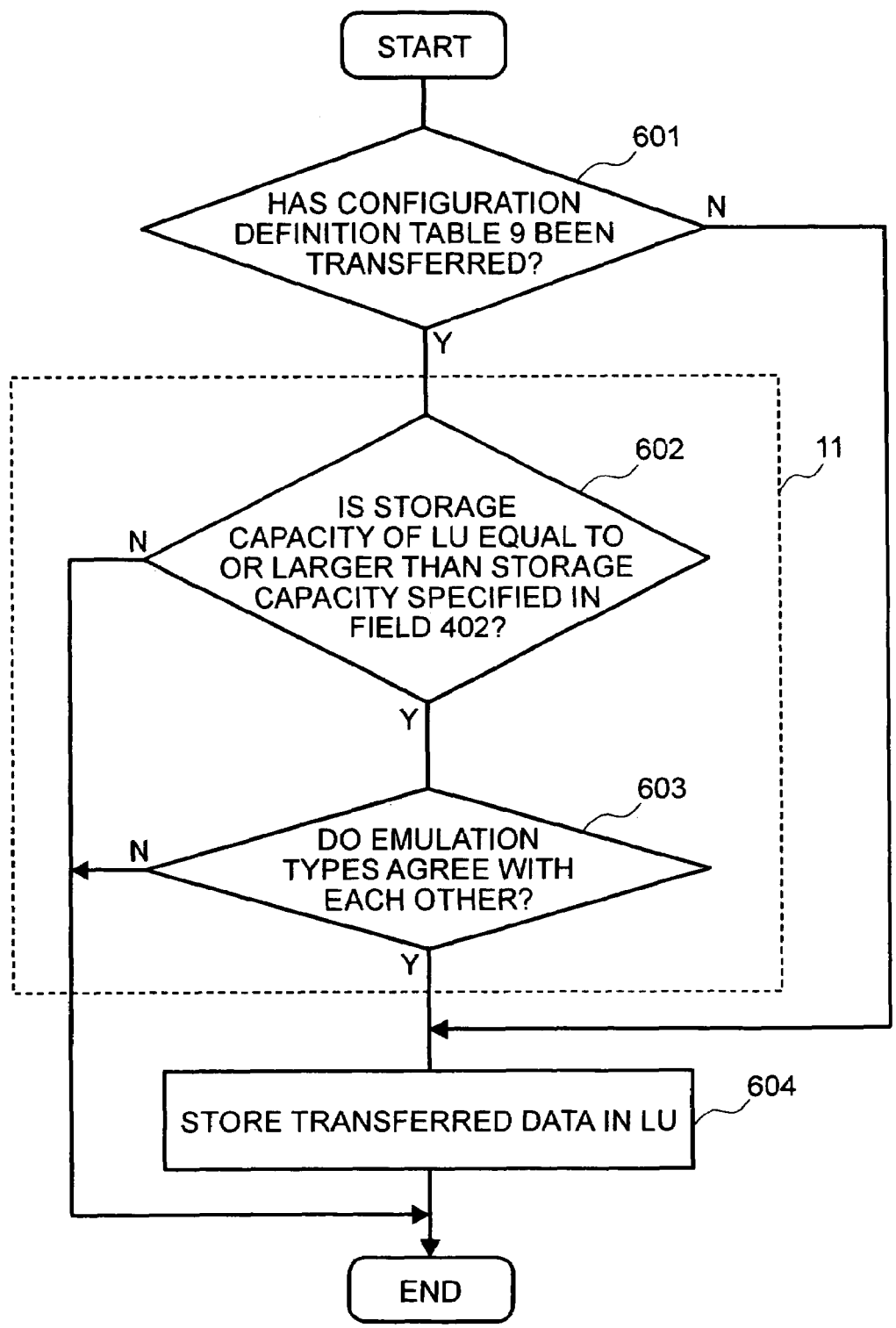
FIG. 5 is a flow diagram which shows describes an example of a data receiving procedure.

Referring to FIG. 1 to FIG. 10, an embodiment of the present invention will be described. FIG. 1 shows the configuration of an embodiment of a computer system. The system comprises a server 1a, a server 1b, a storage subsystem 2a, and a storage subsystem 2b. The servers and systems are interconnected over a network 3. The server 1b may be, as described later, a computer connected on the network 3 later.

As far as the present system is concerned, the server 1a and storage subsystem 2a shall constitute a primary site, while the server 1b and storage subsystem 2b shall constitute a secondary site.

The server 1 is a computer comprising a CPU 101, a main memory 102, a network interface 103, a display 104, a keyboard 105, a CD-ROM 106, a controller 107, a disk drive 108, and a data interface 109.

The storage subsystem 2 is realized with storage devices in which data is stored, and it comprises ports 21, a disk controller 22, a control memory 23, a processor 24, a cache memory 25, and disk drives 26. Incidentally, the disk drives 108 and 26 are logical storage devices. In reality, a plurality of physical storage devices may constitute one logical storage device. In this case, the plurality of physical storage devices may constitute a disk array. Herein, the physical storage device refers to a hard disk drive or a physical storage device having a storage medium such as a digital versatile disk (DVD).

A database management system program 4, an application program 5, a configuration definition file creation program 6, and a volume mount program 18 are stored in the disk drive 108 included in the server 1. These programs are installed from the CD-ROM 106 into the disk drive 108, then read into the main memory 102, and run by the CPU 101. Incidentally, the programs need not be installed from the CD-ROM 106, but may be installed into the disk drive 108 over the network 3 on which the server 1 is connected.

A pair definition table 7 used to manage the relationship of correspondence (hereinafter, pair relationship) between each of the disk drives 26 included in the primary site and each of the disk drives 26 included in the secondary site, a volume definition table 8a used to manage one or more disk drives 26 (one or more of disk drives 26a to 26c) as one or more storage areas (hereinafter volumes), and a data transfer program 16 that is run by the processor 24a when data stored in any of the disk drives 26 is transferred to the storage subsystem 2b in the secondary site are stored in the control memory 23a included in the storage subsystem 2a.

A configuration definition table 9, indicating to what part of an OS file system a volume is assigned (hereinafter, mounted), is stored in the disk drive 26 whose leading location corresponds to the leading position in the volume, or a predetermined location in a volume. Hereinafter, the configuration definition table shall be stored at the leading location in the volume. The primary and secondary sites share the stored location. The secondary site receives information on the stored location from the primary site or a user. Moreover, an environmental variable definition file 15 in which the name of a definition information file is registered is stored in the disk drive 26 realizing the volume. Herein, setting information on the database management system program 4 or application program 5 that run on the server 1 which uses the volume is recorded in the definition information file. Information on the stored location of a file in which information on an environmental variable relevant to the server 1, such as, setting information on a program to be run in the server 1 is recorded, is registered in the environmental variable definition file 15.

According to the present embodiment, a file system in which the volume is mounted gives a predetermined name to the environmental variable definition file 15. A value recorded in the environmental variable definition file 15 indicates a name inherent to the application program 5 or the like, and the name need not be a filename, but may be, for example, a work directory name.

A DBMS definition information file 10, that is a definition information file relevant to the database management system program 4, and an application definition information file 13, that is a definition information file relevant to the application program 5, are stored in the disk drives 26. The files are assigned filenames that are registered in the environmental variable definition file 15 and stored in the disk drives 26.

The server 1 runs the configuration definition file creation program 6 so as to create the environmental variable definition file 15 and program definition information files.

Moreover, data 14 used within the database management system program 4 and application program 5 are stored in the disk drives 26. Furthermore, the database management system program 4, application program 5, and configuration definition file creation program 6 may be stored in the disk drives 26 included in the storage subsystem 2a. In this case, when the server 1 uses the programs, the server 1 reads the programs from the storage subsystem 2 over the network 3, and stores them in the disk drive 108 for use.

A data reception program 17, a pair definition table 7, a volume definition table 8b, and a definition check program 11 are stored in the control memory 23b included in the storage subsystem 2b.

When the storage subsystem 2b receives data sent from the storage subsystem 2a via the port 21d over the network 3 and stores the data in the disk drives 26d to 26f, the processor 24b runs the data reception program 17.

The definition check program 11 judges whether data the storage subsystem 2b has received from the storage subsystem 2a is contained in the configuration definition table 9. If the data is contained in the configuration definition table 9, when the contents of a configuration definition are checked, the processor 24b runs the definition check program 11.

Copies of the configuration definition table 9, environmental variable definition file 15, DBMS definition information 10, application definition information 13, and data that are stored in the disk drives 26 included in the storage subsystem 2a are stored in the disk drives 26d to 26f.

FIG. 2 shows an example of the structure of the pair definition table 7. The pair definition table 7 has: a group name field 201 in which names of groups each of which corresponds to a set of pair relationships are registered; a pair name field 202 in which names assigned to pair relationships are registered; a primary port name field 203 in which names assigned to the ports of the storage subsystem 2a included in the primary site that have a pair relationship are registered; a primary logical unit name field 204 in which names assigned to logical units in the storage subsystem 2b included in the secondary site that have a pair relationship are registered; a secondary port name field 205 in which names assigned to the ports of the storage subsystem 2b included in the secondary site that have a pair relationship are registered; a secondary logical unit name field 206 in which names assigned to logical units in the storage subsystem 2b included in the secondary site that have a pair relationship are registered; and a state field 207 in which the states of pair relationships are registered.

The logical unit (LU) is a unit in which the storage areas formed with the disk drives 26 are managed. Moreover, a volume is uniquely identified with a combination of the name of a port via which an LU is accessed and the name of the LU associated with the volume. Hereinafter, a port name and an LU name will be used to express a volume as a volume (port name, LU name). According to the present embodiment, one LU is associated with one volume. Alternatively, a plurality of LUs may constitute one volume.

In the example of FIG. 2, a group G1 having two pair relationships P1 and P2 is defined. A record 208a indicates that a volume in the primary site having the pair relationship P1 is a volume (port 21b, LU0), a volume in the secondary site having the pair relationship P1 is a volume (port 21d, LU0), and the state of the pair relationship is active. Herein, the active state signifies that copying data between the pair indicated with the record 208, that is, making the data items in the primary and secondary sites consistent with each other, is under way. Moreover, a record 208b indicates that a volume in the primary site having the pair relationship P2 is a volume (port 21, LU1), a volume in the secondary site having the relationship P2 is a volume (port 21d, LU1), and the state of the relationship is active.

FIG. 3 shows an example of the structure of the volume definition table 8. A user creates the volume definition table 8 using a volume definition program in advance. Herein, the volume definition program is a program to be run in a management computer (not shown) connected on the network 3. The user uses the management computer to transmit information on volumes, which should be included in the storage subsystem 2, to the storage subsystem 2.

The storage subsystem 2 registers the received information in the volume definition table 8. The volume definition table 8 has: a port name field 305 in which names of ports, based on which volumes are identified, are registered; an LU name field 301 in which names of LUs forming volumes are registered; a drive name field 302 in which names of disk drives 26 realizing the volumes are registered; and an emulation type field 303 in which pieces of information on the ways (hereinafter, emulation types) a computer employs a volume are registered.

According to the present embodiment, for example, a volume definition table 8a shown in the upper part of FIG. 3 shall be stored in the control memory 23a, and a volume definition table 8b shown in the lower part of FIG. 3 shall be stored in the control memory 23b. In the volume definition table 8a shown in FIG. 3, two volumes are registered. A record 304a indicates that a volume (port 21b, LU0) is realized with the disk drive 26a, and it is not categorized to any specific emulation type. Records 304b and 304c indicate that a volume (port 21b, LU1) is realized with the disk drives 26b and 26c and categorized to an emulation type of RAID level 1.

On the other hand, two volumes are registered in the table 8b. A record 304d indicates that a volume (port 21d, LU0) is realized with the disk drive 26d and is not categorized to any specific emulation type. Records 304e and 304f signify that a volume (port 26d, LU1) is realized with the disk drives 26e and 26f and categorized to the emulation type of RAID level 1.

FIG. 4 shows an example of the structure of the configuration definition table 9. In the case of the storage subsystem 2a in the primary site, when the server 1a runs the volume mount program 18, the configuration definition table 9 is created. In the case of the storage subsystem 2b in the secondary site, when the storage subsystem 2b writes the configuration definition table 9, which is received from the storage subsystem 2a in the primary site, in a volume, the configuration definition table 9 is created.

The configuration definition table 9 has: a mount destination field 401 in which information on a directory in which a volume is mounted is registered; a storage capacity field 402 in which information on the storage capacity of the volume is registered; and an emulation type field 403 in which information on an emulation type is registered.

A table 9a, as shown in the upper part of FIG. 4, is an example of the configuration definition table 9 stored in a volume (port 21d, LU0) (realized with the disk device 26a) in the storage subsystem 2a. The information that the mount destination of a volume (port 21d, LU0) is a directory /AP/vol1, the storage capacity thereof is 100 MB, and the volume is not categorized to any specific emulation type is registered as a record 404a. Incidentally, the expression /AP/vol1 of an access path in a file system shall be adopted as the expression of a file or a directory in the file system.

A table 9b, as shown in the lower part of FIG. 4, is an example of the configuration definition table 9 stored in a volume (port 26d, LU1) (realized with the disk drives 26a and 26b) in the storage subsystem 2a. The information that the mount destination of a volume (port 26d, LU1) is a directory /DB/vol1, the storage capacity thereof is 200 MB, and the volume is categorized to an emulation type of RAID level 1 is registered as a record 404b.

Referring to FIG. 1, the actions of the present system will be outlined below. To begin with, a user uses a management computer to specify values in the volume definition table 8a in the storage subsystem 2a in advance.

Thereafter, when the server 1a is started up, the server 1a mounts a volume, which is included in the storage subsystem 2a, in a file system. At this time, the server 1a creates the configuration definition table 9 that has configuration information indicating the relationship of the volume to the file system that is the mount destination, and it stores the configuration definition table 9 in the disk drive 26 realizing the volume.

Thereafter, the server 1a creates the DBMS definition information 10 that constitutes a definition information file to be used to run the database management system program 4a, and the application definition information 13 that constitutes a definition information file to be used to run the application 5a. The server 1a then stores the created pieces of information in the volume. Moreover, the server 1a creates the environmental variable definition file 15 as a file in which information on the stored locations in the storage subsystem 2a of environmental variables, such as those contained in the definition information files, is registered. The server 1a stores the file 15 in the volume included in the storage subsystem 2a.

In order to configure the secondary site, a user connects the storage subsystem 2b included in the secondary site on the network 3 and uses the management computer to create the volume definition table 8b concerning the storage subsystem 2b and to register values in the table. Thereafter, the server 1a directs the storage subsystem 2a to transfer data items, which are stored in the disk drives 26a to 26c, to the storage subsystem 2b. Consequently, the configuration definition tables 9, environmental variable definition file 15, application definition information 13, DBMS definition information 10, and data 14 stored in the disk drives 26a to 26c are stored in the storage subsystem 2b in the secondary site.

For the data transfer, the storage subsystem 2b checks if the configuration definition table 9 is included in the transferred data items and if the configuration definition table 9 matches the situation of the associated volume included in the storage subsystem 2b. If the configuration definition table 9 does not match the situation, the storage subsystem 2b does not preserve the configuration definition table 9 in the disk drive 26 concerned.

When the server 1b is connected on the network 3 and started up, the server 1b runs a configuration definition program 12 so as to recognize the volume included in the storage subsystem 2b and mount the volume.

At this time, the server 1b reads the configuration definition table 9a from the disk drive 26 so as to acquire a directory name that is the mount destination of the volume realized with the disk drive 26. Based on the acquired mount destination directory name, the volume is mounted. Incidentally, the server 1b references the pair definition table 7 so as to retrieve a group name, of which pair relationships are all suspended, as an object of the mount.

Thereafter, the server 1b acquires the environmental variable definition file 15 from the mounted volume, and it checks the file 15 for the stored locations of various definition information files. The server 1b then initiates the database management system program 4b and application program 5b. Consequently, once the server 1b reads the configuration information such as the configuration definition table 9, the server 1b can acquire setting information relevant to a file system serving as the mount destination of the volume and setting information relevant to an application that uses the volume. Without the server 1a, a volume can be mounted or an application can be set up. The detailed procedure of the foregoing actions will be described in conjunction with the drawings.

FIG. 8 illustrates a procedure 1000 for mounting a volume by running the volume mount program 18 in the CPU 101. First, the server 1 acquires from a user the name of a directory in which a volume is mounted (hereinafter a mount destination directory name) and a device filename indicating the volume to be mounted.

Within an application program or a file system a user employs, a volume is recognized with a device filename, as will be described later. The server 1 references a volume-device file map that will be described later to retrieve information on a port and an LU, with which a predetermined volume is determined, on the basis of the device filename. Using the information, the volume included in the storage subsystem 2 is designated (step 1001).

Thereafter, the server 1 checks if the configuration definition table 9 is stored at the leading location in the volume designated with the device filename. Specifically, the server 1 transmits information on the designated volume (more particularly, the port name and LU name), and it also transmits a command requesting the configuration definition table 9 to the storage subsystem 2. The server 1 then receives the result of the transmission from the storage subsystem 2. Incidentally, the server 1 acquires the information concerning the stored location of the configuration definition table 9 (the leading location in a volume according to the present embodiment) from any other server 1 or by receiving a user's entry. Consequently, in response to the command requesting the configuration definition table 9, the server 1 transmits the configuration definition table 9 together with the information on the stored location. However, the storage subsystem 2 may have the information on the stored location of the configuration definition table 9. In this case, the server 1 merely transmits the command requesting the configuration definition table 9 to the storage subsystem 2 (step 1005).

If the configuration definition table 9 is not stored in the user-designated volume, the server 1 first references the volume definition table 8 to retrieve the storage capacity of the designated volume and the emulation type thereof from the size field 306 and emulation type field 303, respectively. Specifically, the server 1 designates the volume in the storage subsystem 2, requests the storage subsystem 2 to transmit information on the storage capacity of the volume and the emulation type thereof, and receives the information (step 1002).

Thereafter, the server 1 creates the configuration definition table 9 on the basis of the mount destination directory name of the volume, the storage capacity thereof, and the emulation type thereof, and it transmits the table to the storage subsystem 2. The stored location of the configuration definition table 9 is the leading location in the designated volume. Specifically, the server 1 transmits the information on the mount destination directory name, storage capacity, and emulation type to the storage subsystem 2, and directs the storage subsystem 2 to write the information at the leading location in the designated volume. At this time, the server 1 creates the environmental variable definition file 15 relevant to the designated volume, and it directs the storage subsystem 2 to store the file in the designated volume (step 1003).

Finally, the server 1 mounts the designated volume in a place determined with the mount destination directory name acquired at step 1001 or with the mount destination direction name designated by the server 1 (step 1004). If it is judged at step 1005 that the configuration definition file 9 is present, the server 1 executes step 1004 described above.

FIG. 5 describes an example of a procedure to be achieved by running the data reception program 17 and definition check program 11 in the storage subsystem 2b. The storage subsystem 2b executes the procedure to check the contents of information sent from the storage subsystem 2a.

Incidentally, every time data is transferred between the storage subsystems 2, information on a port name in the primary site and information on an LU name and its location therein are appended to the data. The storage subsystem 2b, having received the data, references the primary port field 203 and primary LU field 204 of the pair definition table 7 to retrieve a record 208 that contains the same port name and volume name as those contained in the received data. The storage subsystem 2b then designates a volume, which is determined with the values that are specified in the secondary port name field 205 and secondary LU name field 206 and that are contained in the record 208, as a volume in which the received data is stored. Furthermore, the storage subsystem 2b determines the stored location in the volume, in which the data is stored, according to the value of position information contained in the received data. Incidentally, when a volume is realized with disk drives 26 that constitute a RAID disk drive, the storage subsystem 2 determines uniquely at what location in whichever of the disk drives 26 data is recorded.

The storage subsystem 2b having received data first verifies whether the received data contains the configuration definition table 9. Specifically, if the configuration definition table 9 is stored at the leading location in a volume, the storage subsystem 2b verifies whether the configuration definition table 9 is contained in the received data by checking whether the leading data in the volume has been sent from the storage subsystem 2a. Whether the leading data in the volume has been sent from the storage subsystem 2a is judged from information on a location contained in transferred data.

Incidentally, the storage subsystem 2b receives information on the stored location of the configuration definition table 9 from the primary site or a user in advance. Specifically, the storage subsystem 2b receives the information on the stored location transferred from the server 1a in the primary site. Otherwise, the storage subsystem 2b receives the information on the stored location which a user registers at the time of registering a volume definition table using the management terminal (step 601).

If the received data contains the configuration definition table 9, the storage subsystem 2b checks if the storage capacity of a volume in which the transferred configuration definition table 9 is stored is larger than the storage capacity registered in the field 402 of the configuration definition table 9. Incidentally, the storage subsystem 2b references the pair definition table 7 on the basis of the information on the volume (port name and LU name) that is transferred together with the configuration definition table 9. Thereafter, the storage subsystem 2b references the volume definition table 8b so as to retrieve the value specified in the size field 306 and contained in a record that contains the information on the volume (step 602).

Assume that the storage capacity of the volume in which the configuration definition table 9 is stored is larger than the storage capacity registered in the field 402. In this case, the storage subsystem 2b checks if the value registered as the emulation type of the volume in the volume definition table 8b agrees with the value registered in the emulation type field 403 of the transferred configuration definition table 9 (step 603). If the values agree with each other, the transferred configuration definition table 9 is stored in the volume. If it is judged at step 601 that the configuration definition table 9 has not been transferred, the storage subsystem 2 stores the transferred data in the volume (step 604).

In contrast, it may be judged at step 602 that the storage capacity of the volume is smaller than the one registered in the field 402, or it may be judged at step 603 that the emulation types are different from each other. In this case, the storage subsystem 2b does not store the transferred data in the disk device 26, but terminates the procedure.

Figure 6:
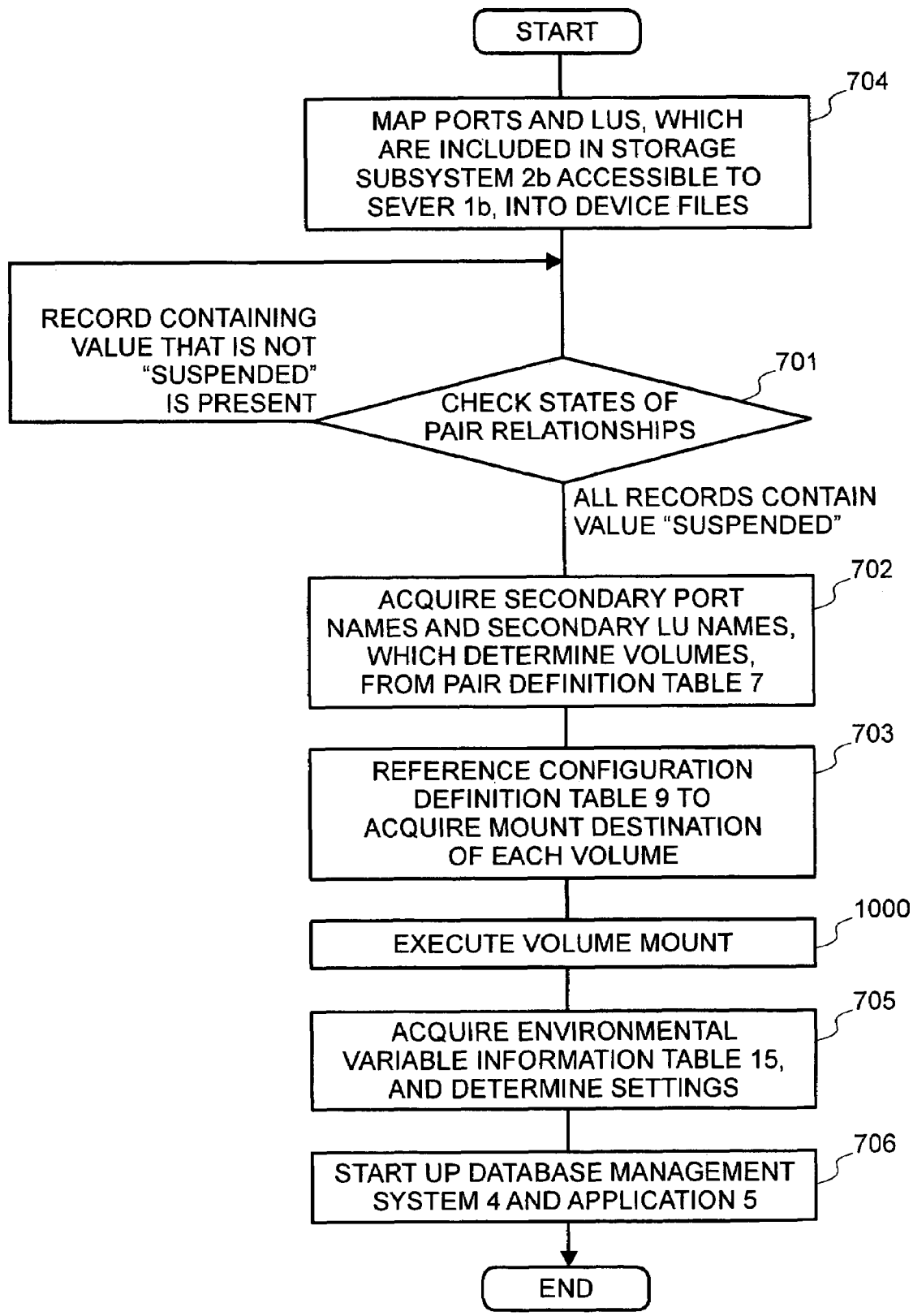
FIG. 6 is a flow diagram which shows an example of a procedure designated as a component definition program 12.

FIG. 6 shows a configuration definition procedure that is executed in the storage subsystem 2b by running the configuration definition program 12 in the server 1b. The present procedure enables the server 1b to run the application program 5 or the like using the volumes included in the storage subsystem 2b. The present procedure is executed, for example, when the server 1b is connected on the network 3 and started up, or when a user enters a volume mount command at the server 1b.

To begin with, the server 1b acquires the information on all the ports and all the LUs, which are included in the storage subsystem 2b accessible to the server 1b, from the storage subsystem 2b. The items of information are associated with device files managed by a file system residing in the server 1b. Data representing the relationship of correspondence between each item of information and each device file, that is, a volume-device file map 1101, as shown in FIG. 9, is stored in the main memory 102 or one of the storage devices 108 (step 704).

Thereafter, the server 1b checks the state field 207 of the pair definition table 7 included in the storage subsystem 2b to see if there is a group having pair relationships whose states are all suspended. Incidentally, what is referred to as a suspended state is a state in which the contents of data items in volumes having a pair relationship to each other are not kept consistent with each other (step 701). If there is a group having pair relationships whose states are all suspended, the server 1b references the pair definition table 7 included in the storage subsystem 2b to retrieve the values that are registered in the secondary port name field 205 and secondary LU name field 206 in relation to the group name (step 702).

Thereafter, the server 1b references the maps created at step 704 so as to retrieve device files associated with the volumes determined with the port names and LU names acquired at step 702. On the other hand, the server 1b reads the configuration definition table 9 from the leading location in each of the volumes associated with the device files. The server 1b then retrieves information on the mount destination directory name of each of the volumes from the field 401 of the configuration definition table 9 (step 703).

Thereafter, the server 1b uses the retrieved device filenames and mount destination directory names as arguments to run the volume mount program 18, and, thus, it mounts the volumes in the file system that is a mount destination (step 1000). After mounting all the volumes that belong to the group having pair relationships, whose states are all suspended, is completed, the server 1 acquires the environmental variable definition file 15 from each of the mounted volumes, and it checks the values registered in the environmental variable definition files 15 (step 705).

Thereafter, the server 1b starts running the database management system program 4b and application program 5b. At the time running of the database management system program 4b and application program 5b is started, the server 1b identifies the location of a definition information file on the basis of the information registered in each of the environmental variable definition files 15 acquired previously. The server 1b then acquires the definition information files (step 706).

A description will be made of a case where the configuration information present in the primary site included in the system shown in FIG. 1 (according to the present embodiment, the configuration definition tables, environmental definition information files, and various program definition information files) and data are transferred to the storage subsystem 2b in the secondary site. Herein, the pair definition table 7 shown in FIG. 2 and the volume definition table 8a shown in FIG. 3 shall be present in the control memory 23a included in the storage subsystem 2a. Moreover, the pair definition table 7 shown in FIG. 2 and the volume definition table 8b shown in FIG. 3 shall be present in the control memory 23b included in the storage subsystem 2b.

When the server 1a connected on the network 3 is started up, the server 1a acquires information on the volumes, which are included in the storage subsystem 2a connected to the data interface 109a, from the storage subsystem 2a. The items of information are associated with device files and stored as the volume-device file map 1101a. The volume-device file map 1101a is stored in the main memory 102 included in the server 1a. FIG. 9 shows examples of the volume-device file maps 1101. In the present case, a volume (port 21b, LU0) is associated with a device file whose name is /dev/cltld1, and a volume (port 21b, LU1) is associated with a device file whose name is /dev/cltld2.

Thereafter, the server 1a receives mount destination directory names in which the volumes are mounted and device filenames associated with the mounted volumes from a user or an application. The server 1a then runs the volume mount program 18 (step 1000).

FIG. 10 shows an example of information which the server 1a receives from a user as a mount destination directory-device file map 1201. The server 1a having received the mount destination directory-device file map 1201 judges from a record 1202a that the volume associated with the device file /dev/cltld1 is mounted in the directory /AP/vol1. The server 1a also judges from a record 1202b that the volume associated with the device file /dev/cltld2 is mounted in the directory /DB/vol1 (step 1001).

Thereafter, the server 1a verifies whether the configuration definition table 9 is stored in each of the volumes designated with the device filenames. First, the server 1a verifies whether the configuration definition table 9 is stored in the volume designated with /dev/cltld1. The server 1a retrieves information on a port that determines the designated volume, or more particularly, the port name of port 21b and the LU name of LU0, from the volume-device file map 1101a. The server 1a, having acquired the items of information, accesses the storage subsystem 2a using the items of information. The server 1a then judges whether the configuration definition table 9 is stored at the leading location in a disk drive 26 comparable to the leading location in the volume. In this case, the configuration definition table 9 has not yet been stored in the volume. The server 1a therefore judges that the configuration definition table 9 is absent (step 1005).

Thereafter, the server 1a references the volume definition table 8a to retrieve the emulation type and size of the volume to be mounted. In the present case, the server 1a references the emulation type field 303 and size field 306 so as to retrieve values contained in a record 304a that has the port name of port 21b and LU name of LU0 specified in the port name field 305 and LU name field 301, respectively. Consequently, the server 1a acquires the information that the volume to be mounted is not categorized into any emulation type and has a storage capacity of 100 MB (step 1002).

Thereafter, the server 1a enters the acquired mount destination directory name (/AP/vol1), emulation type (none), and size (100 MB) in the mount destination field 401, emulation type field 403, and storage capacity field 402 of the configuration definition table 9a. Thereafter, the server 1a transmits the created configuration definition table 9a to the storage subsystem 2a, and it directs the storage subsystem 2a to store the configuration definition table 9a at the leading location in the volume to be mounted. In the present case, the value contained in the record 304a and specified in the drive field 302 of the volume definition table 8a shown in FIG. 3 demonstrates that the disk drive 26 realizing the volume is the disk drive 26a. Consequently, the configuration definition table 9a is disposed at the leading location in the disk drive 26a (step 1003).

Thereafter, the server 1a mounts the volume (port 21b, LU0) associated with the device file /dev/cltld1 in a location designated with the acquired mount destination directory name (step 1004).

The server 1a performs the same processing on a volume associated with a device filename contained in a record 1202b. The server 1a directs the storage subsystem 2a to store the configuration definition table 9b shown in FIG. 4 at the leading location in volume (port 21b, LU1), and then it mounts volume (port 21b, LU1) in a place designated with /DB/vol1.

In the present case, the values contained in the records 304b and 304c and specified in the drive field 302 of the volume definition table 8a shown in FIG. 3 demonstrate that the volume is realized with the disk drives 26b and 26c. If a volume is realized with a plurality of disk drives 26, whichever of the leading locations in the disk drives corresponds to the leading location of a volume is determined by the storage subsystem 2a. In this case, the leading location in the disk drive 26b corresponds to the leading location of the volume. Therefore, the configuration definition table 9b is stored at the leading location in the storage area of the disk drive 26b.

Thereafter, the server 1a transmits information on a stored location of environmental variables defined by the server 1a, or, more particularly, a stored location of an application definition information file, to the storage subsystem 2a. At this time, the server 1a directs the storage subsystem 2a to create an environmental variable definition file 15 having a predetermined filename in a mounted volume and to record the transmitted information in the file 15. According to the present embodiment, the filename of the environmental variable definition file 15 shall be /AP/vol1/env.txt, and the stored location thereof shall be a location in the disk drive 26a. According to the present embodiment, the information that a DBMS configuration definition information file is stored as a file /DB.vol1/db.conf and an AP configuration definition information file is stored as a file /AP/vol1/ap.conf is registered in the environmental variable definition file 15 (step 501).

Thereafter, the server 1a transmits the definition information files relevant to the database management system 4a and application 5a, respectively, to the locations registered in the environmental variable definition file 15. In the present case, the definition information 10 on the database management system 4a is stored as a file /DB/vol1/db.conf, and the definition information 13 on the application program 5a is stored as a file /AP/vol1/ap.conf. The volume mounted in /DB/vol1 is realized with the disk drives 26b and 26c. However, the DBMS definition information 10 is stored in the disk drive 26b. Moreover, as the volume mounted in /AP/vol1 is realized with the disk drive 26a, the application definition information 13 is stored in the disk drive 26a (step 502).

Next, a description will be made of a procedure for transferring data, which is stored in the disk drives 26a to 26c included in the storage subsystem 2a, to the disk drives 26d to 26f included in the storage subsystem 2b over the network 3. The data transfer is executed after the pair definition table 7 is created. The procedure is started at the time that a user uses the server 1 or the like to direct the storage subsystem 2a to transfer data.

The storage subsystem 2a appends information on the ports and LUs included therein and information on stored locations of data items to the data items stored in the disk drives 26a to 26c, respectively, and it transfers the resultant data items to the storage subsystem 2b. After data transfer is completed, the data items stored in the disk drives 26a to 26c, respectively, may be updated. In this case, if the contents of data items in the storage subsystems 2a and 2b are kept consistent with each other, the storage subsystem 2a transfers updated data alone to the storage subsystem 2b.

The storage subsystem 2b having received data from the storage subsystem 2a executes the procedure illustrated in FIG. 5. First, the storage subsystem 2b judges whether the configuration definition table 9 has been transferred from the storage subsystem 2a. Specifically, the transferred data is checked to see if it is the data stored at the leading location in a volume. Whether the transferred data is the data stored at the leading location in a volume is judged by checking to see if position information appended to the transferred data is 0 (step 601).

If the configuration definition table 9a shown in FIG. 4 is transferred, the storage subsystem 2b runs the definition check program 11 so as to acquire the information on the port and LU included in the storage subsystem 2a which is appended to the transferred data. In the present case, the information that the port name is port 21b and the LU name is LU0 is acquired. Thereafter, the storage subsystem 2b retrieves the record 208a, which contains port 21b and LU0 as the values of the primary port name field 203 and primary LU name field 204, from the pair definition table 7 stored in the control memory 23b. The storage subsystem 2b then acquires the values (herein, port 21d and LU0) specified in the secondary port name field 205 and secondary LU name field 206 from the record 208a.

Thereafter, the storage subsystem 2b acquires the record 304d that contains port 21d and LU0 as the values of the port name field 305 and LU name field 301, respectively, of the volume definition table 8b. The storage subsystem 2b then compares the value of 100 MB, which is contained in the record 304d and specified in the size field 306, with the value of 100 MB that is contained in the record 404a and specified in the storage capacity field 402 of the configuration definition table 9 (step 602). Since the values agree with each other, the storage subsystem 2b checks to see if the value contained in the record 304d and specified in the emulation type field 303 agrees with the value contained in the record 404a and specified in the emulation type field 403 (step 603).

Since the values agree with each other and signify that the volume is not categorized into any emulation type, the storage subsystem 2b stores the transferred data in the volume (port 2d, LU0). The stored location is represented by position information appended to data.

The foregoing procedure is repeated for every data item to be transferred. Consequently, the configuration definition tables 9, environmental variable definition file 15, application definition information 13, DBMS definition information 10, and data 14 that are stored in the disk drives 26a to 26c included in the storage subsystem 2a in the primary site are copied into the disk drives 26d to 26f included in the storage subsystem 2b in the secondary site. Moreover, after the data items are copied, if the data in any of the disk drives 26a to 26c in the primary site is updated, the change is reflected in the associated one of the disk drives 26d to 26f in the secondary site.

Next, a description will be made of an example of a procedure for connecting the port 21d of the storage subsystem 2b in the secondary site to the data interface 109 in the server 1b over the network 3, starting up the server 1b, and determining the environment of the server 1b.

When the server 1b is started up, the configuration definition program 12 is read into the main memory 102b and run by the CPU 101b. First, the server 1b associates the ports and LUs, which are included in the storage subsystem 2b accessible to the server 1b, with device files. In this example, the LUs accessible via the port 21d are the two LUs LU0 and LU1 alone. Device filenames determined by the file system residing in the server 1b are associated with the LUs. A created volume-device file map is the one 1101b shown in FIG. 9. Referring to FIG. 9, a volume (port 21d, LU0) is associated with /dev/cltld1, and a volume (port 21d, LU1) is associated with /dev/cltld2.

Thereafter, the server 1b references the state field 207 of the pair definition table 7 present in the control memory 23b included in the storage subsystem 2b to check the pair relationships of the volumes. Specifically, the server 1b checks to see if there is a group having pair relationships, whose states are all suspended, as specified in the field 207 represent the state. If the pair definition table 7 is as shown in FIG. 2, the server 1b judges that there is a record containing a value that is not "suspended," and it repeats the processing of step 701.

If a fault occurs in the primary site, the pair relationships are all suspended. FIG. 7 shows the pair definition table 7 signifying this state. In this example, records 208a and 208b demonstrate that all the pair relationships belonging to group G1 are suspended. Consequently, the server 1b judges that the pair relationships belonging to group G1 are all suspended.

Thereafter, the server 1b retrieves from the pair definition table 7 the information on the volumes relevant to the group having pair relationships whose states are all suspended. In this case, the server 1b acquires the information on two volumes, that is, a volume (port 21d, LU0) and a volume (port 21d, LU1) (step 702). Hereinafter, the server 1b successively performs the processing of step 703 and step 100 on the volumes.

First, the server 1b performs the processing of step 703 on the volume (port 21d, LU0). Specifically, the server 1b acquires a device filename associated with the volume (port 21d, LU0) from the volume-device file map 1101b. On the other hand, the server 1b reads the configuration definition table 9 from the leading location in the volume (port 21d, LU0). In this example, the volume (port 21d, LU0) is realized with the disk device 26d, as indicated in the volume definition table 8b shown in FIG. 3. The server 1b therefore acquires the configuration definition table 9a from the disk drive 26d.

Thereafter, the server 1b references the mount destination field 401 of the acquired configuration definition table 9a so as to acquire the mount destination directory name /AP/vol1 in the file system of the volume (port 21d, LU0) that is contained in the record 404a. Thereafter, the server 1b uses the mount destination directory name /AP/vol1 and the acquired device filename /dev/citld1 as arguments to run the volume mount program 18. The server 1b then mounts a volume associated with the device file /dev/cltld1 in the directory /AP/vol1. Likewise, the volume (port 21d, LU1) is mounted in /DB/vol1.

Thereafter, the server 1b acquires the environmental variable definition file 15. In this example, the name of the environmental definition file is env.txt. The server 1b therefore checks to see if the name env.txt is specified in the mounted volume. Incidentally, the server 1b acquires the environmental variable definition filename from the primary site or a user in advance. The manner of acquisition is identical to the manner of acquiring information on the stored location of the configuration definition information table. In this example, the name env.txt is subordinate to the name /AP/vol1. Therefore, the server 1b reads the name env.txt and holds it (step 705). In the environmental variable definition file 15, as mentioned previously, /DB/vol1/db-.conf is registered as the value of the DBMS configuration definition filename, and /AP/vol1/ap.conf is registered as the value of the AP configuration definition filename.

Finally, the server 1b executes the database management system 4b. At this time, the server 1b acquires the DBMS definition information 10 on the basis of the value of the DBMS configuration definition filename registered in the environmental variable definition file 15, and then initiates the database management system 4b. Likewise, the server 1b acquires the application definition information 13 on the application program 5b on the basis of information registered in the environmental variable definition file 15, and then it initiates the application program 5.

As described above, according to the present embodiment, if a fault occurs in the primary site, the port 21d of the storage subsystem 2b in the secondary site is connected to the data interface 109b of the server 1b over the network 3. The server 1b is then started up in order to determine an environment, and the database management system and application are initiated.

According to the present invention, there is provided an inexpensive disaster recovery system whose secondary site may have the configuration thereof simplified.

What is claimed is:

1. A computer system comprising:
a first computer;
a first storage subsystem connected to said first computer;
a second storage subsystem connected to said first storage; and
a second computer connected to said second storage subsystem,
wherein said first computer transmits configuration information present therein to said first storage subsystem,
wherein said first storage subsystem stores said configuration information at a predetermined location in said first storage subsystem, and transfers data, which contains said configuration information and is stored in said first storage subsystem, to said second storage subsystem,
wherein said second storage subsystem receives the data sent from said first storage subsystem, checks if the received data contains said configuration information, and stores said configuration information at a predetermined location in said second storage subsystem,
wherein said second computer checks if said configuration information is stored at said predetermined location in said second storage subsystem, reads said configuration information from said predetermined location, determines various variables, which are employed in said second computer, according to information contained in said configuration information, and configures said second storage subsystem based on said various variables and said configuration information,
wherein when said first computer updates said transferred data, said first storage subsystem transmits the updated data to said second storage subsystem,
wherein said second storage subsystem stores the updated data at a location other than said predetermined location, at which updated data should be stored, in said second storage subsystem,
wherein said second storage subsystem compares information contained in said configuration information transferred from said first storage subsystem with information on the configuration of said second storage subsystem, and if said information disagrees with each other, then storing of said configuration information at said predetermined location is suspended,
wherein said configuration information contains an identifier with which a volume, said first storage subsystem provides for said first computer, is identified, and information on a directory in which said volume is mounted,
wherein said predetermined location in said first storage subsystem is a leading location in said volume,
wherein said configuration information contains information on environmental variables relevant to said first computer, said information environmental variables includes information on locations in said first storage subsystem of definition information files containing definition information,
wherein said configuration information contains database definition information on a database management system that runs in said first computer and first storage subsystem, said database system manages data contained in a database stored in said first storage subsystem,
wherein said configuration information contains application definition information on an application that runs in said first computer, said application processes said data of said database, and
wherein said configuration information contains configuration definition information which indicates to which part of a file system volumes containing said data are assigned.

2. A computer according to claim 1, wherein if said configuration information is not stored at said predetermined location, configuration information is created and transmitted to said first storage subsystem.

3. A computer according to claim 2, wherein when said configuration information is stored at said predetermined location, said first computer reads said configuration information, and sets up said first computer according to the contents of said configuration information.

4. A computer according to claim 3, wherein setting up said first computer includes mounting a volume, which is included in said first storage subsystem, in said file system.

* * * * *